Patented Nov. 10, 1953

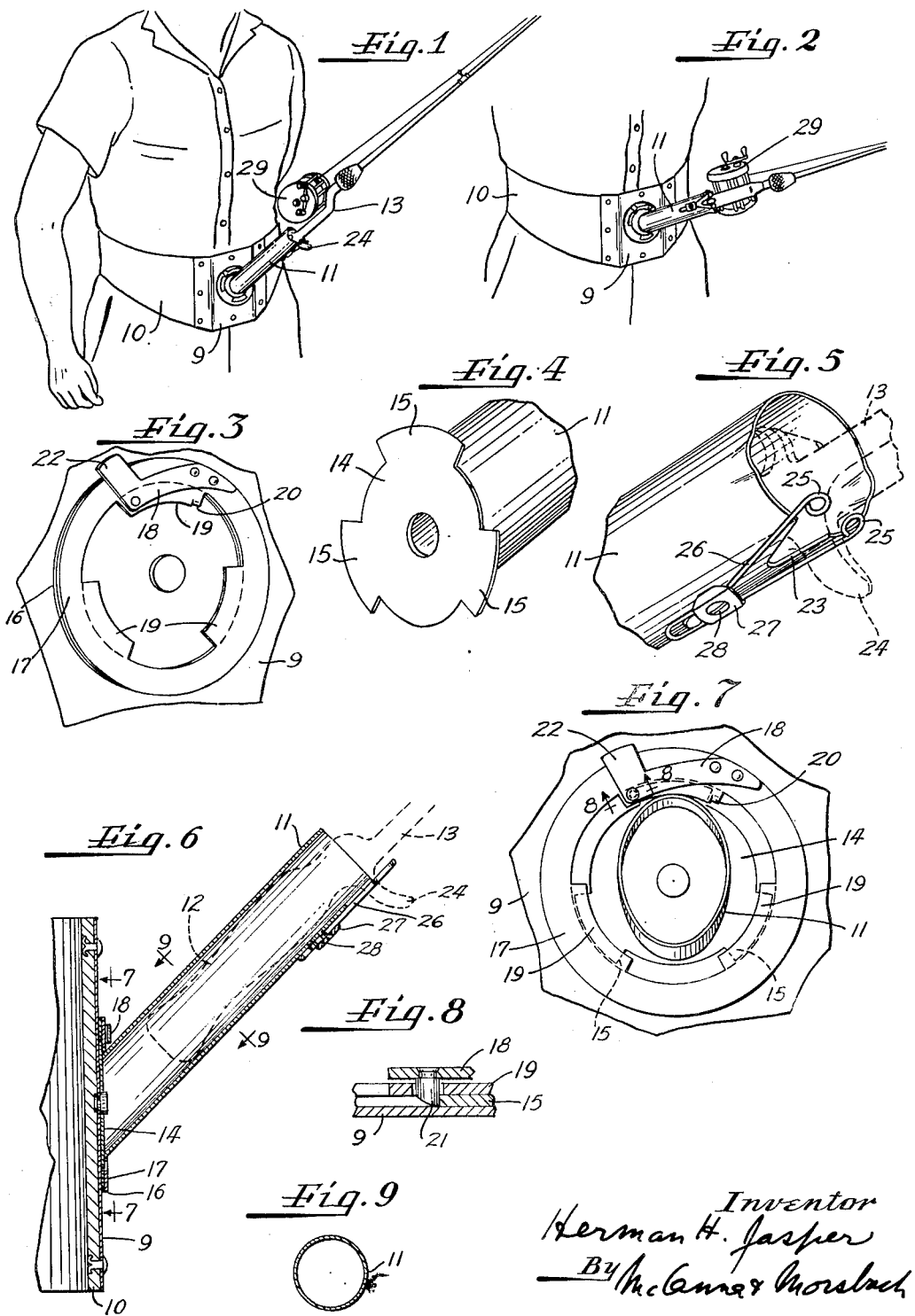

2,658,650

UNITED STATES PATENT OFFICE 2,658,650

FISHING ROD HOLDER

Herman H. Jasper, Bloomington, Ill.

Application January 10, 1950, Serial No. 137,841

1 Claim. (Cl. 224—5)

This invention relates to fishing rod holders.

Heretofore persons afflicted by having only one arm have been handicapped because of the difficulty and sometimes impossibility of participating in the sport of fishing because the customary fishing equipment invariably requires the use of both hands. This is particularly so when it comes to the use of a rod and reel which require dexterous and skillful manipulation. My invention, therefore, has for its principal object the provision of an improved fishing rod holder of such simple and novel construction as to make it easily and expertly usable by one-armed fishermen. In furtherance of this general object my invention contemplates the provision of a fishing rod holder applied in a novel manner to a belt to be worn by the fisherman so that with the casting rod firmly supported in the holder the reel may be freely and easily operated by the one hand and the entire rod may be easily removed and replaced by the one hand.

Another object of my invention is to provide an improved mounting of the holder on the belt for the purpose of permitting easy attachment and detachment of the holder with respect to the belt proper and to permit comfortable wearing of the belt when the holder is removed.

Another object of my invention is to provide an improved fishing rod holder of the character described which may be set to a position for left hand use as well as right hand use.

Another object of my invention is to provide an improved fishing rod holder of the character described which will serve in a practical manner the purposes intended and which is of such simple construction as to permit of manufacture at a comparatively low cost.

Other objects and attendant advantages will be appreciated by those skilled in this art by reference to the following description when considered in connection with the accompanying drawing, in which—

Figure 1 is a perspective view of a fishing rod holder embodying my invention, showing a manner of using it by a right-handed fisherman;

Figure 2 is a similar view but showing the holder in a position for use by a left-handed fisherman;

Figure 3 is an enlarged fragmentary perspective view of the belt or base portion of the holder;

Figures 4 and 5 are fragmentary perspective views showing the base attachment and the handle receiving ends, respectively, of the holder tube;

Figure 6 is a sectional view lengthwise through the holder;

Figure 7 is a sectional view taken substantially on the section line 7—7 of Figure 6;

Figure 8 is a detail section taken on the section line 8—8 of Figure 7; and Figure 9 is a sectional view taken on the section line 9—9 of Figure 6.

The drawings show a preferred illustrative embodiment of my invention. My improved fishing rod holder is characterized by a tubular part for receiving and holding the handle end of a casting rod, a base part carried by a belt to be worn by the user, and a novel connection between the tubular part and the base part whereby the tubular part may be quickly and easily attached for support in any of several positions and whereby when detached the base part and the belt may be worn comfortably and the front of the base attachment portion presents a substantially flush surface which will not interfere with outer garments and the like. The base part comprises a plate 9 preferably of light alloy metal suitably fastened to a belt 10. The belt plate as well as the belt should be of substantial vertical dimension in order to provide good support for the tubular rod holding part which is designated generally by 11. This tubular part 11, also preferably of light alloy metal, is of suitable length and diameter to receive the handle 12 of a casting rod designated generally by 13. The tubular part 11 may be made in different lengths to accommodate rod handles of different sizes. To the base end of the tubular part 11 is fixed an attachment plate 14 which is preferably flat and at an acute angle with respect to the tubular part at its top side, as shown in Figure 6. This attachment plate is shaped to provide circumferentially spaced, arcuate projections 15 and intermediate spaces. The belt plate 9 is provided with socket shaped retaining means to receive and lock these projections 15 and consequently the plate 14 in the attached working position on the belt plate. This is accomplished in the present embodiment by using two flat ring members 16—17 and a latch member 18. The ring members are fixed as by soldering or welding to the belt plate. The inner diameter of the ring members is of a size to receive the projections 15 and the outer ring member 17 is shaped to provide circumferentially spaced projections 19 matching the spaces intermediate the projections 15. The inner ring member 16 is of a thickness to provide sufficient socket depth to receive the projections 15. Thus by inserting the attachment plate 14 into the opening provided by the ring members 16—17 and turning the tubular holder 11 and its plate 14 about the center axis of the plate 14 the projections 15 will be moved into the spaces beneath the projections 19. Turning movement of the tubular holder is limited by a suitable stop such as 20, formed by turning inwardly a portion of one of the projections 19 so that they will be engaged by the adjacent projection 15, as shown in Figure 7. The latch member 18 is provided with a detent 21 adapted to engage behind the opposite edge of the last mentioned projection 15 to lock the tubular member against displacement from this position, as shown in Figures 7 and 8. The latch member 18 is provided with a suitable portion 22 for finger engagement by the user to withdraw the detent 21. This can easily be accomplished by inserting a finger beneath the portion 22 and exerting outward pressure thereon while at the same time turning the tubular member in a counterclockwise direction viewing Figure 7 to remove the tubular member.

Provision is made for releasably holding the casting rod firmly in the tubular member. This is accomplished by providing a V-shaped slot 23 in the outer end of the tubular member to receive the usual finger projection 24 on the rod handle, and by further providing a spring clip having opposed spring members 25 arranged to snap over the finger member 24 when the latter is seated in the socket 23. The spring members 25 may be formed on the ends of the U-shaped spring member 26 which is adjustably fastened to the outer side of the tubular member 11 by means of a clamping plate 27 and a screw 28 which fastens the clamping plate to the tubular member. Obviously by loosening the screw 28 the spring clip 26 may be adjusted lengthwise to the proper position. It will be observed that the slot 23 and the spring clip 26 are arranged to locate the reel 29 in a position for convenient use of the right arm when intended for a right-armed person, as shown in Figure 1. In this arrangement the reel 29 is at the top and the handle of the reel is at the right. With this construction the tubular holder 11 may also be attached to the belt plate in a position with the reel 29 at one side of the rod and with the reel holder at the top so that the reel handle may be operated by the left hand. This latter position is shown in Figure 2. Thus with a single construction the tubular holder may be mounted in either of the two positions, one in which the reel may be operated by the right hand and the other in which it may be operated by the left hand. It will also be observed that in either of these positions the rod is firmly supported and the reel may be operated by a person having only one arm, either left or right. It will also be observed that the construction provides for easy removal of the rod from the tubular holder by pulling the rod outwardly against the spring resistance of the clip members 25, also that the tubular holder 11 may be removed or remounted by means of one hand. It will be further observed that I have a relatively broad base mounting for the tubular member which gives a firm and stable support for the tubular member and the rod. This construction is also advantageous because it eliminates projecting parts when the tubular holder is removed, which projecting parts would be objectionable as an obstruction to clothing and to bodily interference with other objects when the person moves about.

It is believed that the foregoing gives a clear understanding of my invention and it should be apparent that changes may be made in details of construction without departing from the spirit and scope of my invention as expressed in the appended claim, in which.

I claim:

In a fishing rod holder of the kind wherein a fisherman's casting rod with reel is used in combination with a belt worn by the fisherman and in which the casting rod is provided on its handle portion with a rod locating means in predetermined relation to the handle and the casting reel and the belt is provided at its front with a plate having flat projections in circumferentially spaced relation and spaced from the belt plate to provide therewith a flat retainer socket having circumferentially spaced socket openings, the combination of a tubular rod holder having an open end to receive the handle portion of the casting rod and provided at its opposite end with a flat disc-like attachment plate having circumferential projections shaped to enter said retainer socket openings and to be held therein beneath said belt plate by rotative movement of the attachment plate with respect to the belt plate, the tubular rod holder having locating means complemental to that on the handle portion of the casting rod and shaped for coaction therewith to hold the casting reel in a predetermined position for right handed use, and means for locking the attachment plate to the belt plate in one position of said attachment plate in said retainer socket for said right handed use of the rod and for locking the tubular rod holder in a second position effected by rotative movement of said attachment plate with respect to the belt plate for left handed use of the rod.

HERMAN H. JASPER.

References Cited in the file of this patent
UNITED STATES PATENTS

| Number | Name | Date |
|---|---|---|
| 259,142 | Hart | June 6, 1882 |
| 1,174,319 | Hipwood | Mar. 7, 1916 |
| 1,619,152 | Nunlist | Mar. 1, 1927 |
| 1,985,985 | Gerline | Jan. 1, 1935 |
| 2,092,060 | Gairing | Sept. 7, 1937 |
| 2,271,136 | Geiger | Jan. 27, 1942 |
| 2,515,426 | Rodgers | July 18, 1950 |
| 2,537,456 | Goss | Jan. 9, 1951 |